(No Model.)
W. GUTENKUNST.
ADJUSTABLE STOP FOR HAY CARRIERS.
No. 296,746. Patented Apr. 15, 1884.
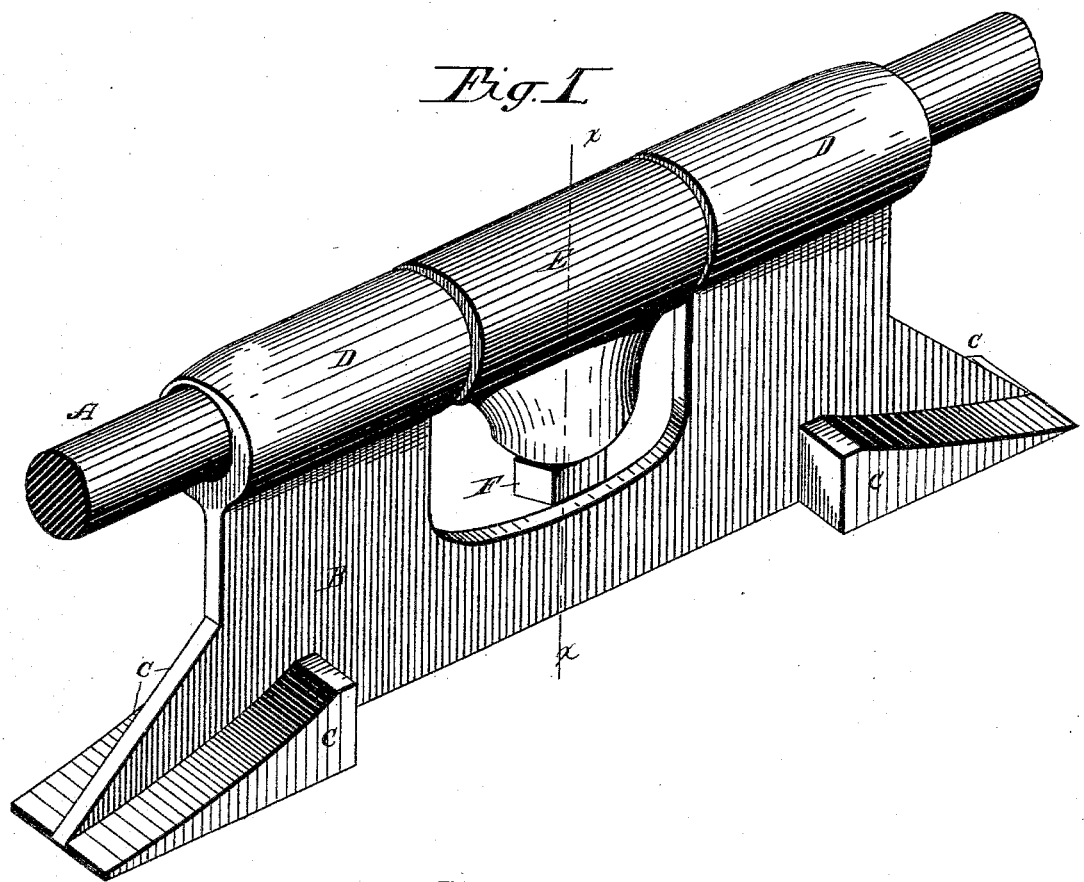
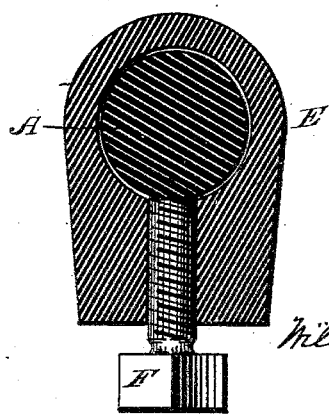
Witnesses:
C. B. Story.
Wm Sinnott.
Inventor:
William Gutenkunst
By,
Erwin & Benedict
Attorneys.

UNITED STATES PATENT OFFICE.

WILLIAM GUTENKUNST, OF MILWAUKEE, WISCONSIN.

ADJUSTABLE STOP FOR HAY-CARRIERS.

SPECIFICATION forming part of Letters Patent No. 296,746, dated April 15, 1884.

Application filed January 26, 1884. (No model.)

*To all whom it may concern:*

Be it known that I, WILLIAM GUTENKUNST, a citizen of the United States, residing at Milwaukee, in the county of Milwaukee and State of Wisconsin, have invented certain new and useful Improvements in Adjustable Stops for Hay-Carriers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in stops for hay-carriers.

The object of my invention is, first, to provide a stop adapted to be used upon a rod or cable carriage-way, and which will not when so used be affected by the turning or rolling movement of the rod or cable, but will remain at all times in a vertical position, as required, to permit of the carrier engaging thereon; second, to provide a right-and-left or two-way stop for a rod or cable, which two-way stop will permit the carriage to pass over it and be used on either side of it without reversing or removing said stop or carriage.

My invention is further explained by reference to the accompanying drawings, in which Figure 1 represents a perspective view of the stop attached to a rod. Fig. 2 is a cross-section of the same, drawn on line $x\ x$ of Fig. 1.

Like part are represented by the same reference-letters in both views.

A represents the rod or cable upon which the hay-carrier is supported and operated in the ordinary manner.

B represents my improved form of carriage-stop, which is located upon the rod or cable over the hay to be elevated, and is adapted to both retain the hay-carrier at a fixed point above the hay as the fork is elevated and also to disengage the fork from which the hay has been discharged upon its return from the place of deposit.

The stop B is provided with supporting-sleeves D D, which surround and are loosely fitted to the rod A in such a manner that the stop will be retained by its own gravity in a true vertical position for the reception of the approaching carrier from either direction, regardless of the rolling movement of the rod.

Interposed between the sleeves D D is a tubular block, E, provided with a set-screw, F, by which such block is rigidly fastened at any desired point of adjustment upon the rod A. The peripheries of the sleeves D D and stop E are of uniform size and shape, and are but slightly larger than the carriage-way A, and the outer ends of the sleeves D are tapered so that the wheels of the carrier may readily run upon them as the carriage passes over the same.

C C are angular retaining-lugs, by which the retaining-latch of the approaching carrier is raised as it enters said stop from either direction, and the supporting-tackle of the hay-fork automatically disengaged, and also whereby said carriage is retained at a fixed point upon the supporting-way A as the fork with its load of hay is elevated.

Having thus described my invention, what I claim as new, and desire to secure by Letters Patent, is—

1. The combination of the rod or cable way A, carriage-stop B, provided with loosely-fitting supporting-sleeves D D, and retaining-block E, provided with set-screw F, substantially as and for the purpose specified.

2. The combination, with a rod or cable way, A, of the stop E, provided with set-screw F, and carriage-stop B, provided with loosely-fitting sleeves D D, and at its respective ends with the angular lugs C C, substantially as set forth.

In testimony whereof I affix my signature in presence of two witnesses.

WILLIAM GUTENKUNST.

Witnesses:
JAS. B. ERWIN,
C. T. BENEDICT.